April 5, 1955  G. B. BENANDER  2,705,785
WIRING DEVICE TERMINAL CONNECTING MEANS
Filed Nov. 18, 1952  3 Sheets-Sheet 2
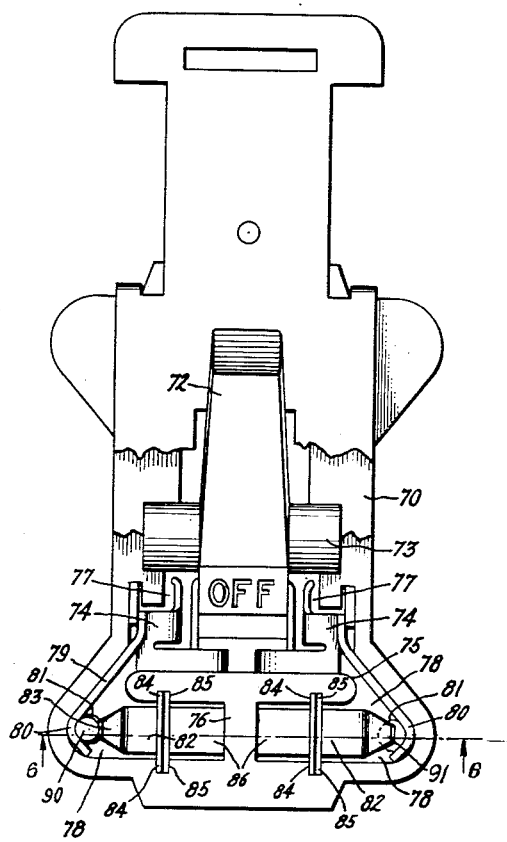
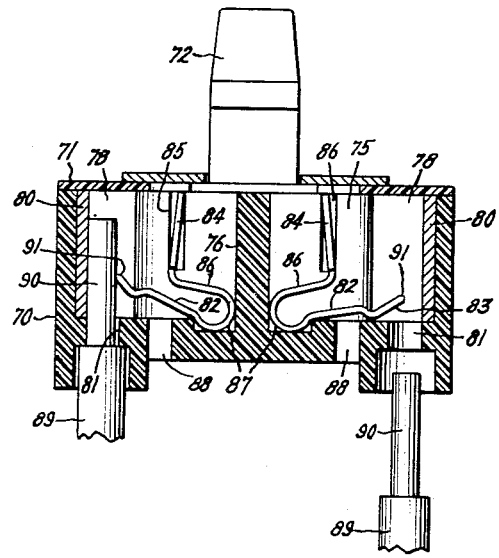
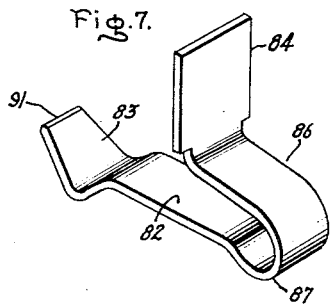
Inventor
George B. Benander
by
His Attorney April 5, 1955 G. B. BENANDER 2,705,785
WIRING DEVICE TERMINAL CONNECTING MEANS
Filed Nov. 18, 1952 3 Sheets-Sheet 3
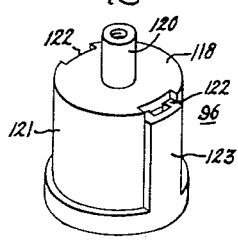
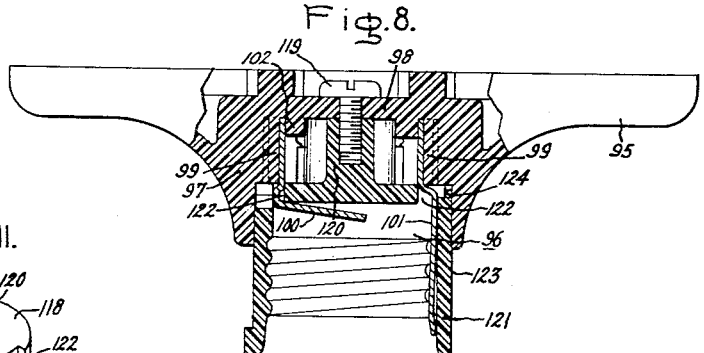
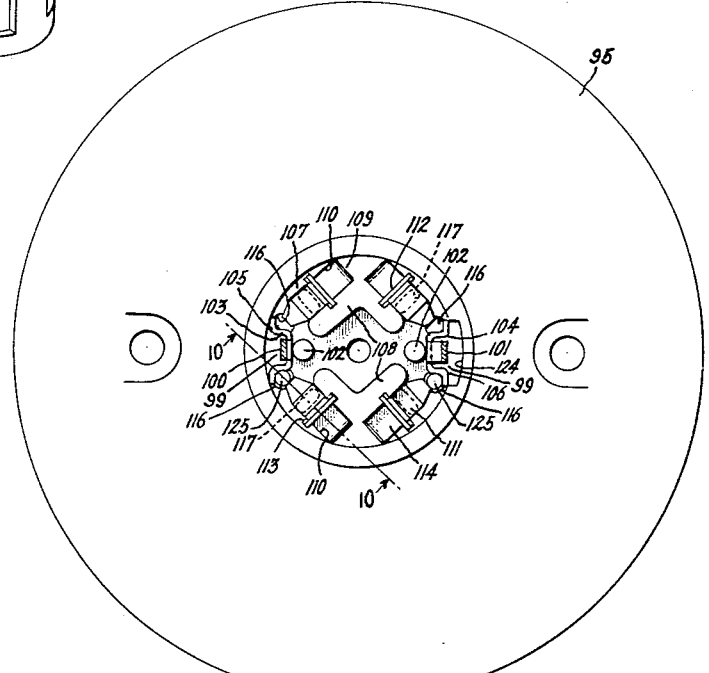
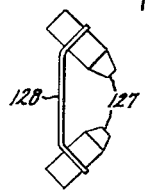
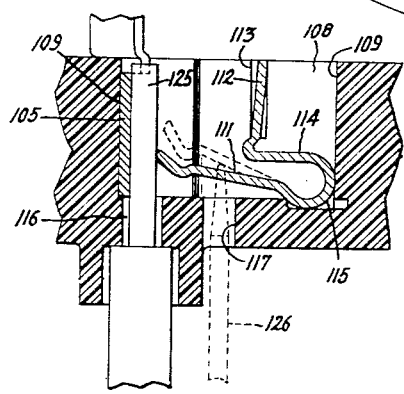
Inventor:
George B. Benander,
by
His Attorney.

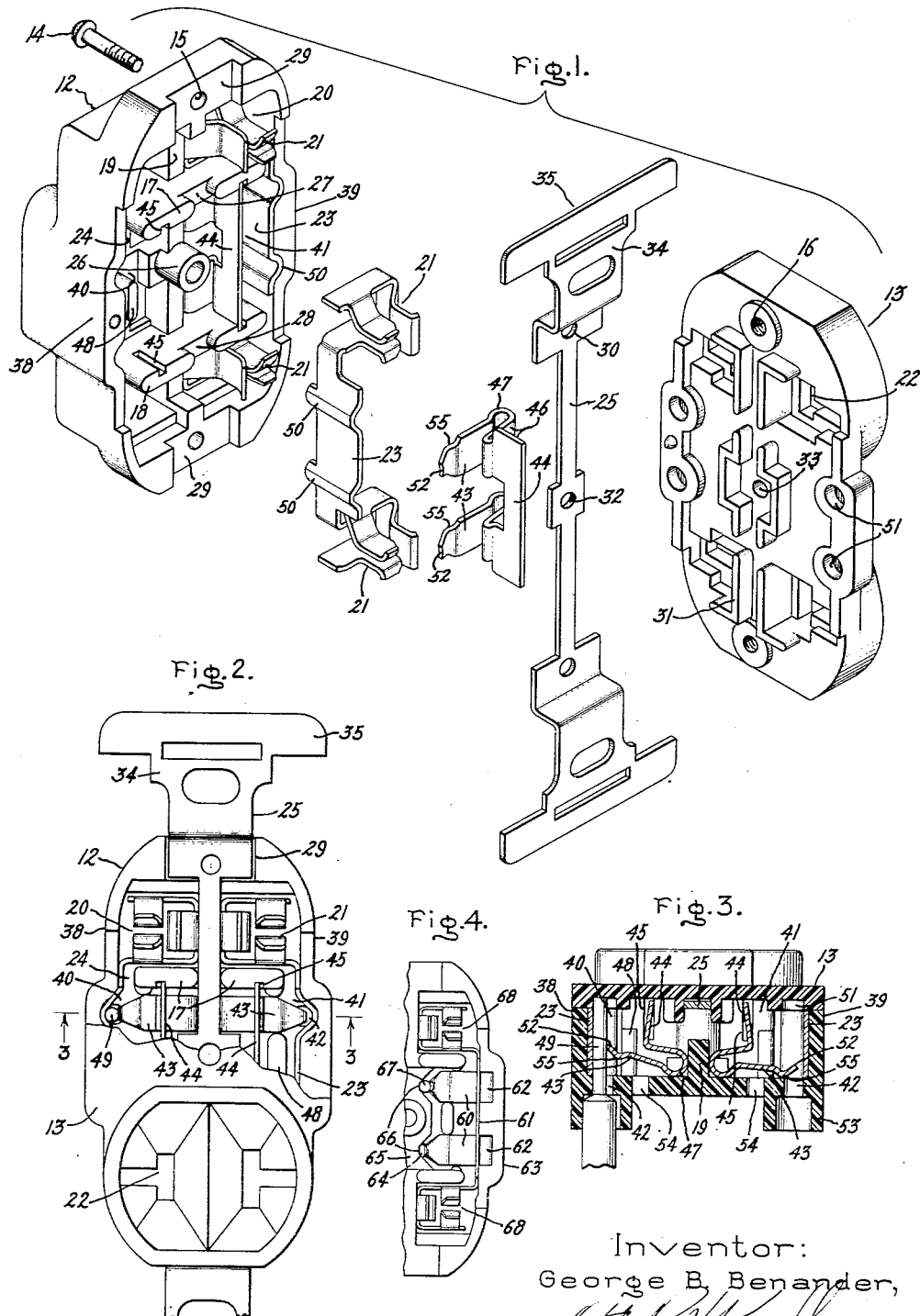

United States Patent Office 2,705,785
Patented Apr. 5, 1955

2,705,785
WIRING DEVICE TERMINAL CONNECTING MEANS

George B. Benander, Oak Lawn, R. I., assignor to General Electric Company, a corporation of New York Application November 13, 1952, Serial No. 321,149

14 Claims. (Cl. 339—164)

The present invention relates to wiring devices such as plug receptacles, switches, lamp sockets, and the like, and particularly to the connectors which form a part of such devices for connecting the electric wires thereto.

The object of the invention is to provide an improved connector structure for such wiring devices in which the conducting wires are electrically connected to the wiring device and thereby automatically locked in place, by simply inserting the bared end of the wire through an opening in the housing of the device, and improved wiring structures embodying such connector structure.

For a consideration of what I believe to be novel and my invention, attention is directed to the following specification and to the claims appended hereto.

According to the invention, a wall of a cavity in a wiring device housing is provided with a conductor wire receiving opening, an edge of which is flush with an adjacent terminal bar or an adjacent wall surface, and extending across such wall in line with the opening is a locking tongue, one end of which is held against the cavity wall opposite the adjacent terminal bar or wall surface, the other end projecting over an edge of the opening, whereby a bared conductor wire end pushed through the opening into the cavity will be clamped between the adjacent terminal bar or the adjacent wall surface and the end of the locking tongue and the locking tongue will be wedged between opposed walls of the cavity. This specific arrangement of locking tongue is a feature of the invention for by such arrangement I am enabled to provide at low cost a thoroughly reliable conductor wire connecting means as is pointed out hereinafter.

In the drawing,

Fig. 1 is an exploded view of a duplex plug receptacle embodying the invention.

Fig. 2 is a top plan view of the receptacle, a portion of its cover being broken away to show the parts beneath it.

Fig. 3 is a sectional view taken on line 3—3, Fig. 2.

Fig. 4 is a plan view of a part of a duplex receptacle showing a modification of the invention.

Fig. 5 is a top plan view with parts broken away of an electric switch embodying the invention.

Fig. 6 is a sectional view taken on line 6—6, Fig. 5.

Fig. 7 is a perspective view of an element of the improved connector as embodied in an electric switch.

Fig. 8 is a side view, partly in section, of a ceiling fixture for an electric lamp embodying the invention.

Fig. 9 is a plan view of the fixture base with the contacts, terminal bars, and locking tongues assembled therein.

Fig. 10 is a detailed sectional view taken on line 10—10, Fig. 9.

Fig. 11 is a perspective view of the fixture cover member.

Fig. 12 is a detail view of a modification.

Referring to Figs. 1 to 3, 12 indicates the base of a duplex plug receptacle and 13 the cover which is attached to the base by screws 14, one at each end of the receptacle, which extend up through openings 15 in the base and thread into openings 16 in the cover. Base 12 and cover 13 are made of suitable insulating material and together form a housing or casing for the several metal contact and connector parts of the receptacle. Base 12 is provided adjacent to its ends with transversely extending partition walls 17 and 18 which in conjunction with a centrally located longitudinally extending partition wall 19 define four contact cavities 20, one at each corner of the base. Partition wall 19 is of a height less than partition walls 17 and 18, its height being best indicated in Fig. 3. In each cavity is a contact structure 21 comprising spaced spring fingers adapted to make contact with the contact blades of an attachment plug cap of usual construction, cover 13 being provided with slots 22 through which contact blades of a plug cap may be inserted. The pair of contact structures on each side of the base are connected together by a terminal bar 23, the contact fingers in the present instance being formed integral with the terminal bar as is well shown in Fig. 1. Terminal bars 23 stand edgewise in the base. They extend through slots 24 in transverse partition walls 17 and 18 and are held in place between the bottom wall of base 12 and cover 13. Terminal bars 23 are the parts to which the current-carrying conductors or wires are to be connected. Extending longitudinally of base 12 is a mounting strap 25 which at its center rests on a tubular post 26 projecting upward from partition wall 19 and at its ends rests in notches 27 and 28 in partition walls 17 and 18 and notches 29 in the end walls of the base. Strap 25 is clamped between base 12 and cover 13 and is held also by the screws 14 which pass through openings 30 in the strap. The underside of cover 13 is provided with pairs of projecting flanges 31 which straddle strap 25, the two end pairs being positioned between adjacent cavities 20. At its center, in line with post 26, strap 25 has a threaded opening 32 and cover 13 has an opening 33 for receiving a face plate screw (not shown) for fastening a face plate in place. At its ends strap 25 is provided with ears 34 having openings for screws for fastening the receptacle in an outlet box, and wide ears 35 which may rest against a plaster surface for leveling the receptacle with respect to a plaster wall.

The structure so far described is a known one and is to be taken as typical of any suitable plug receptacle, whether of the type wherein the contacts and terminal bars are inserted from the front as shown and held between the base and a front cover, or of the type wherein the contacts and terminal bars are inserted from the rear and are held in place by a back cover plate.

My invention has to do with the construction and arrangement for fastening conductor wires to terminal bars 23.

According to the embodiment of my invention shown specifically in Figs. 1 to 3, partition walls 17, 18 and 19 are shaped and spaced with respect to side walls 38 and 39 of the base to provide terminal cavities 40 and 41, one on each side of the base, the ends of such cavities being defined by transverse partition walls 17 and 18 and the sides by longitudinal partition wall 19 and the opposed side walls 38 and 39 of the base. Terminal bars 23 extend along the inner surfaces of side walls 38 and 39 and are dimensioned to lie firmly against such inner surfaces which form rigid backings for them. In the bottom wall of the base on each side of the base are one or more conductor wire receiving openings 42 which communicate with cavities 40 and 41. The outer edges of openings 42 are substantially in line with the inner surfaces of terminal bars 23. In the present instance two openings into each cavity are shown, whereby two wires may be connected to each terminal bar. A plurality of wire openings is provided so that a lead wire and one or more branch wires may be connected to each terminal bar, whereby the receptacle serves also as a junction block in a well understood manner.

In the terminal cavities in connection with each opening 42 is a spring locking tongue 43 which extends transversely across the cavity in line with the opening 42 with which it is associated. At its inner end, it is seated on the bottom wall and it bears against the partition 19. Its outer end is free and projects to a position where it extends somewhat over the inner edge of opening 42 as well shown at the right-hand side of Fig. 3. The two spring tongues 43 in each cavity are carried by and formed integral with an anchoring strip 44 which extends longitudinally across the cavity and has its ends held in slots 45 in partition walls 17 and 18. Slots 45 are located in walls 17 and 18 centrally between partition wall 19 and the base side walls so that the anchoring strips are located centrally in the terminal cavities. The anchoring strips 44 are connected to the spring locking tongues by offset arms 46, the connection between each tongue and its related offset arm being formed at a reentrant angle such as rounded elbow 47 which is positioned in the terminal cavity corners between bottom and side walls of the cavities. This arrangement provides substantial support for the inner ends of the tongues against both the bottom wall and the side wall. The elbows serve also to add to the resiliency of the spring tongues. Slots 45 are of a depth such that the upper edges of anchoring strips 44 are substantially flush with the top surface of base 12 so that cover 13 serves to hold the anchoring strips in the slots. With this arrangement the anchoring strips are held firmly in slots 45 and serve in turn to hold the spring locking tongues firmly in place against the inner walls of the terminal cavities. The locking tongues are held from sidewise or twisting movement and are guided by being positioned between bosses on the adjacent surfaces of partition walls 17 and 18 and the side edges of posts 48 which project upwardly from the bottom wall of base 12 as best shown in Fig. 2.

To connect a lead wire or conductor to a terminal bar, it is necessary merely to insert the bare wire or conductor end into an opening 42 as shown at the left-hand side of Fig. 3 where 49 indicates the end of a lead wire from which the insulation has been removed. When thus inserted, the free end of the locking tongue engages the wire and holds it firmly against the terminal bar 23. For holding the wires from sidewise movement and also to provide greater contact surface between the wires and the terminal bars, I may provide the terminal bars with angular or V-grooves 50 in which the wires rest; also cover 13 may be provided with recesses 51 in which the ends of the wires are positioned when a wire is inserted through an opening 42 until it contacts the underside of the cover.

The free ends of the spring locking tongues project over openings 42 to a point such that they are spaced from the adjacent surfaces of the terminal bars a distance somewhat less than the diameter of the smallest wire with which the receptacle is to be used, (for example, #14 American Wire Gage wire), so that when the wire is inserted through the opening, it will raise the tongue from a position as shown at the right-hand side of Fig. 3 to a position as shown at the left-hand side of Fig. 3 wherein the wire is positioned between the contact bar and the end of the locking tongue and the tongue extends at a downwardly sloping angle from the wire. When thus positioned, a pull on the wire serves to wedge it more firmly between the terminal bar and the end of the locking tongue, bringing it into tight engaging contact with the terminal bar and holding it firmly against removal. Openings 42 are of a size to permit of insertion of the largest diameter wire with which the receptacle is to be used (for example #10 American Wire Gage wire) and the arrangement is such that the spring locking tongue will engage such size wire and lock it firmly to the terminal bar. Tongues 43 at their free ends are bent upwardly somewhat as shown at 52 to provide angularly extending tips which serve as guides to guide a wire end to a position between the tongue and the terminal bar and the ends of such tips may be wedge-shaped or serrate whereby they will tend to bite into the wire when the wire is subjected to a pull.

Surrounding each opening 42 is a sleeve 53 having an inside diameter larger than the overall diameter of the largest wire with which the receptacle is to be used, whereby a portion of the insulated wire at the base of the bared end will be housed by the sleeve as shown in Fig. 3 to prevent any exposure of bare wire.

To permit of removal of a wire after it has been connected to the receptacle, there is provided in the bottom wall of the housing beneath each locking tongue an opening 54 through which the end of a suitable tool, such as a screwdriver, may be passed to engage the underside of the tongue and by an inward push move it away from locking engagement with the wire end. Preferably the tongues are provided with transverse beads 55 adjacent tips 52 which, when a tool is inserted through an opening 54 to release the wire, will be engaged by the end of the tool to hold it from accidentally sliding across the bottom of the tongue and becoming wedged between the end of the tongue and the terminal bar.

To connect conductor wires to the receptacle, the insulation is first removed from the ends of the wires to expose suitable lengths of bare conductor. The correct amount of insulation to be removed can be readily judged from the depth of the receptacle; or the amount to be removed can be measured by placing the wire against the side of the receptacle; or, if one is provided, by using the strip gauge marked on the receptacle. The depth of the sleeve 53 is such that the measurement is not critical. Then, after the insulation has been removed, all that is necessary is to push the bared ends of the wires through the openings 42. This is a very simple operation which can be quickly performed without tools other than a tool for stripping the wire ends, and is a substantial timesaver over the usual screw connection, a thing of importance in view of the high cost of labor. At the same time it provides a wholly satisfactory terminal connection.

In Fig. 4 is shown a duplex plug receptacle embodying a modification of my invention wherein the spring locking tongues 60, corresponding to the spring locking tongues 43 of Figs. 1 to 3, are formed as integral, current carrying parts of the terminal bars 61, which correspond to the terminal bars 23 of Figs. 1 to 3. In this modification the elbows 62, which are similar to elbows 47 of Figs. 1 to 3, are anchored against the inner surfaces of the side walls 63 of the receptacle and the free ends of the tongues terminate at openings 64 in the bottom wall of the receptacle, which openings are in line with the surfaces of longitudinal partition wall 65 corresponding to the partition wall 19 of Figs. 1 to 3, the partition wall being provided with V-grooves 66 to receive the wire ends. A wire end is indicated at 67. In this arrangement the electrical connections between the terminal bars and the wire ends 67 are through the spring locking tongues. The contact fingers, which are integral with the terminal bars, are indicated at 68. Except as noted above, the Fig. 4 construction may be similar to that of Figs. 1 to 3 and wires may be connected to it and disconnected from it in the same manner.

Figs. 5, 6 and 7 show the invention embodied in a tumbler type electric switch. It may be a switch of any suitable type. Only sufficient parts of the switch are shown as are needed for an understanding of the invention. In these figures, 70 indicates the base of the switch, 71 the cover, and 72 the actuating lever which is pivoted on the base on trunnion 73. When moved on its pivot, lever 72 actuates a switch blade (not shown) which spans or connects together switch contacts 74. This is a known type of switch structure and is to be taken as typical of such structures.

In base 70 are partition walls 75 and 76 which with side and end walls of the base define contact cavities 77 in which contacts 74 are located and terminal cavities 78. Formed integral with contacts 74 are terminal bars 79 which extend into terminal cavities 78 and have rounded or V-shaped ends 80. Bars 79 stand edgewise in the base and extend along and are in firm engagement with the outer walls of cavities 78 which walls provide a solid backing for them. In the bottom wall of base 70 are openings 81, the outer edges of which are in alignment with the inner surfaces of V-shaped ends 80. Positioned in and extending transversely across cavities 78 are spring locking tongues 82 similar to the locking tongues 43 of Figs. 1 to 3, and similarly arranged with respect to openings 81. At their inner ends they engage and are anchored against the surfaces of partition wall 76. At their outer ends they stand partly over openings 81 and are preferably provided with angularly turned ends to provide the tips 83. Locking tongues 82 are carried by and formed integral with anchoring strips 84, the ends of which are held in slots 85 in partition wall 75 and the opposed switch base end wall. Slots 85 are located centrally of the walls of the cavities. The anchoring strips 84 are connected to the locking tongues by offset arms 86, the connection between the two being in the form of a rounded elbow 87 similar to the elbow 47 of Figs. 1 to 3. In the assembled structure, cover 71 holds the anchoring strips 84 in slots 85 and the anchoring strips in turn hold the elbows 87 firmly anchored against partition wall 76. At 88 are openings through which a tool may be inserted to lift a locking tongue from engagement with a wire end to permit of a wire being disconnected from the switch. At the right-hand side of Fig. 6, 89 indicates a wire having a bared end 90 positioned to be inserted up through an opening 81; and at the left-hand side the wire is shown as having been pushed up through opening 81 and locked in contact position against terminal bar 79 by the locking tongue. The end of tip 83 is shown as being wedge-shaped as is indicated at 91.

Referring now to Figs. 8 to 10 inclusive, which show my invention embodied in a ceiling fixture for holding a screw base electric lamp, 95 indicates the base member of the fixture casing and 96 the cover member. Base member 95 has an annular side wall 97 which defines a recess at the central portion of the base having a bottom wall 98. Projecting inwardly into the recess from opposed points on wall 97 are walls 99, the inner surfaces of which form seats against which terminal contacts 100 and 101 are positioned, the inner ends of the contacts being held against the seats by bosses 102 on bottom wall 98. Integral with the inner ends of contacts 100 and 101 are terminal bars 103 and 104 which extend around walls 99 to opposite sides thereof and have shaped ends 105 and 106 which provide grooves to receive the bared ends of conductor wires. Walls 99 form a rigid backing for ends 105 and 106. Also in the base recess projecting from bottom wall 98 are four sets of walls, each set comprising an outer wall 107, an inner wall 108 and an end wall 109 which define terminal bar cavities 110, a cavity for each terminal bar end 105 and 106; and positioned in each cavity 110 is a locking tongue 111, similar to the locking tongues already described, which extends across the cavity and is carried by an anchoring strip 112 positioned in grooves 113 in opposite walls 107 and 108. Anchoring strip 112 is connected to the locking tongue by an offset arm 114, the connection between arm 113 and the locking tongue being in the form of a rounded elbow 115 which rests against end wall 109 which wall forms a rigid backing for it. The free end of each locking tongue terminates in spaced relation to the adjacent terminal bar and beneath such ends are the conductor wire receiving openings 116 and the conductor wire releasing openings 117 arranged after the manner of those already described in connection with the other structures.

Cover 96 comprises a wall 118 which rests on the top surfaces of walls 107, 108 and 109 and is held by a screw 119 which threads into a post 120 on wall 118. The cover thus serves to hold in place the locking tongues and anchoring strips. Carried by wall 118 is a sleeve 121 having threads formed on its inner surface for receiving the threaded base of an electric lamp. Contacts 101 and 100 project through opening 122 at the edge of wall 118 into sleeve 121. The end of contact 100 within the sleeve is bent across wall 118 to form the center contact. The end of contact 101 extends along the inner surface of the sleeve to form the other contact, this being a known contact arrangement. To insure the correct positioning of the cover on the base and to hold it from turning thereon, sleeve 121 is provided with a key 123 on its outer surface which fits into a keyway 124 inside wall 97.

In Figs. 9 and 10, conductor wires connected to the fixture are indicated at 125 and a tool for releasing a conductor wire from the locking tongue is indicated in dotted lines in Fig. 10 at 126.

The manner of connecting conductor wires to and disconnecting them from the fixture of Figs. 8 to 11 will be clear from explanations already given in connection with the other embodiments of the invention.

It will be noted that in Figs. 8 to 11, provisions are shown for connecting two wires to each contact 100 and 101 so that a lead wire and a branch wire may be connected to each; and that each locking tongue has its own anchoring strip. However, if desired, a common anchoring strip may be used for the locking tongues associated with each contact. Such an arrangement is shown in Fig. 12 where the two locking tongues 127 are carried by a single anchoring strip 128.

The invention has the advantage that while it is simple in structure which enables it to be embodied in wiring devices at low cost, a cost at least as low as that of the usual screw terminal, it nevertheless provides an entirely satisfactory terminal connection. In the case of the embodiments other than that of Fig. 4, only a single additional part is required and it may be a simple metal stamping, while in the case of the Fig. 4 modification, the only additional part is the locking tongue formed as a part of the terminal bar. It is to be noted that no pivot pins, screws or tapped holes are required and no additional fastening parts are necessarily required since the locking means may be held in assembled position by means already present for holding the wiring device assembled, the locking means being held by the usual cover. Also the invention has the advantage that it can be assembled easily and without the use of special tools since all that is needed is simply to drop the metal stampings into the molded base, a very simple and low cost operation.

In connection with the construction it is to be noted that all metal or live parts are entirely enclosed in the housing, no such parts being exposed where they may be accidentally contacted or accidentally brought into contact with an enclosing metal outlet box or the like; and this condition obtains after the device is wired since no bare conductor wire is exposed. This is an advantageous feature from both a safety standpoint and from a use standpoint for often considerable crowding of the wires is required in an outlet box.

However, advantages of the invention lie not only in its manufacture but also in its use since, as pointed out above, a wire may be connected to a wiring device embodying the invention by merely pushing it into the device, and it may be disconnected by merely pushing the locking tongue from contact with the wire.

While the invention has been illustrated as being embodied in wiring devices in a manner such that the conductor wires are inserted through the back or bottom wall of the housing, it may be readily arranged in a manner such that the conductor wires are inserted through other walls of the housing.

What I claim as new and desire to secure by Letters Patent of the United States is:

1. In a wiring device having a hollow housing for enclosing at least one contact member therein, and means for mechanically and electrically connecting a wire to said contact comprising a conductor wire-receiving opening in one wall of the housing having an edge substantially in alignment with an adjacent inner wall surface, a resilient locking tongue having its free end overlying said opening, while the opposite end is formed at a reentrant angle with a movable offset arm that has a termination supported within the housing with the reentrant end of the locking tongue in juxtaposition to a partition arranged substantially parallel with said inner wall surface, whereby a conductor wire may be inserted through said opening to compress the locking tongue and its related offset arm until becoming clamped by a strong wedging action afforded by the locking tongue when the reentrant end of the tongue is braced against the said partition.

2. In a wiring device, a housing comprising a base member and a cover member, a contact supported in the housing, and means for mechanically and electrically connecting a wire to said contact comprising a conductor wire-receiving opening in one wall of the housing having an edge substantially in alignment with an adjacent inner wall surface, a resilient locking tongue arranged generally parallel with the wall containing the wire-receiving opening and having one end formed at a reentrant angle with a movable offset arm that terminates in an anchoring portion that is held in place by said cover member thereby holding the reentrant end of the locking tongue seated on the wall containing the wire-receiving opening and bearing against a partition arranged substantially parallel with said inner wall surface whereby a conductor wire may be inserted through said opening to compress the locking tongue and its related offset arm until becoming clamped by a strong wedging action afforded by the locking tongue.

3. In a wiring device as recited in claim 2 wherein there is an access opening in the wall containing the wire-receiving opening and adjacent thereto, while the underside of the locking tongue near the free end thereof is adapted for engagement by a tool that is inserted through the access opening and against the tongue, the said tool serving to withdraw the locking tongue from clamping engagement with the conductor wire.

4. In a wiring device, a housing comprising a base member and a cover member, a contact supported in the housing, a flat terminal bar connected to said contact and extending flatwise against one side wall of the housing whereby the wall forms a rigid backing for such bar, an adjacent wall of said housing having a wire-receiving opening an edge of which is in line with said bar, a resilient locking tongue located within the housing and having a free end which extends over the edge of said opening removed from said terminal bar, the opposite end of said locking tongue being formed at a reentrant angle with a movable offset arm having a termination which is held fixed within the housing with the reentrant end of the locking tongue in juxtaposition to a partition extending from said last-mentioned wall, whereby a conductor wire may be inserted through said opening to compress the locking tongue and its related offset arm until becoming wedged between the terminal bar and the end of said locking tongue while the reentrant end of the tongue is braced against the said partition.

5. In a wiring device, a housing comprising a base and a cover member, a contact supported in the housing, a flat terminal bar connected to said contact and rigidly held within the housing, an adjacent wall of said housing having a wire-receiving opening, an edge of which is in line with said bar, a resilient locking tongue seated in said housing and having a free end which extends over the edge of said opening removed from said terminal bar, the opposite end of said locking tongue being formed at a reentrant angle with a movable offset arm having a termination which is held fixed within the housing with the reentrant end of the locking tongue in juxtaposition to a partition extending from said last-mentioned wall, whereby a conductor wire may be inserted through said opening to compress the locking tongue and its related offset arm into wedged engagement between the terminal bar and the end of said locking tongue when the reentrant end of the tongue is braced against the said partition.

6. In a wiring device, a housing comprising a base member and a cover member, a contact supported in the base member, a flat terminal bar connected to said contact which extends flatwise against one wall thereof whereby the wall provides a rigid backing for such bar, an adjacent wall of said housing having a wire-receiving opening with an edge in alignment with said bar, a spring locking tongue adjacent to the last-mentioned wall and in alignment with said opening, said tongue having a free end which projects over the edge of said opening opposite said terminal bar, the opposite end of said locking tongue being formed at a reentrant angle with a movable offset arm, an anchoring strip formed integrally on said offset arm and fixedly supported in said housing so as to hold the reentrant end of a locking tongue seated on the wall having the wire-receiving opening and bearing against a partition extending from said last-mentioned wall, whereby a conductor wire may be pushed through said opening and wedged between said terminal bar and the locking tongue.

7. A wiring device as recited in claim 6 wherein the said movable offset arm terminates in an anchoring strip that is seated in opposed grooves in the base of the housing and held in place by the said cover member.

8. In a wiring device, a housing comprising a base member and a cover member, walls in the housing which define a contact cavity and a terminal cavity, a contact in the contact cavity, a flat terminal bar connected to said contact which extends edgewise into the terminal cavity and against one wall thereof whereby the wall forms a rigid backing for such bar, a wall of said terminal cavity having a wire-receiving opening an edge of which is in line with said bar, a locking tongue of spring material in said housing with its free end overlying an edge of said opening remote from said terminal bar, the opposite end of said locking tongue being formed at a reentrant angle with a movable offset arm terminating in an anchoring strip, walls in said housing defining a pair of opposed grooves in the terminal cavity for fixedly supporting the anchoring strip to hold the reentrant end of the locking tongue seated on the wall having the wire-receiving opening and bearing against a partition extending from said last-mentioned wall, whereby a conductor wire may be inserted through said opening and wedged between said terminal bar and the free end of said locking tongue, the said locking tongue serving as a rigid strut member bearing against the said partition when an attempt is made to pull the conductor wire against the clamping action afforded by the locking tongue.

9. A wiring device as recited in claim 8 wherein the cover member serves to hold the anchoring strip fixedly secured in the said pair of opposed grooves of the housing.

10. In a duplex plug receptacle, a housing comprising a base member and a cover member, pairs of contact members in the housing, a terminal bar connecting each pair and extending across and in engagement with the inner surface of a side wall of the housing whereby such walls form a rigid backing for the bars, one of said housing members being provided with plug contact blade openings in line with said contact members, and a wall of the housing being provided with wire-receiving openings, edges of which are in alignment with said terminal bars, a plurality of spring locking tongues in said housing and each having a free end overlying an edge of one of said wire-receiving openings, the opposite end of each locking tongue being formed at a reentrant angle with a movable offset arm having a termination which is anchored in said housing to hold the reentrant end of the locking tongue in juxtaposition to a partition extending from said last-mentioned wall, whereby a conductor wire may be inserted through any one of said openings so that the terminal bar as well as the conductor wire and the related locking tongue are all wedged between a side wall and the partition in the housing.

11. A duplex plug receptacle as is recited in claim 10 wherein the terminal bars comprise edgewise positioned flat strips having transversely extending conductor wire-receiving grooves in line with said conductor wire-receiving openings.

12. In a wiring device comprising a housing having a cavity and a contact member therein, current-carrying means for connecting a conductor wire to said contact member comprising a spring locking tongue having one end formed at a reentrant angle with a movable offset arm terminating as an integral part of said contact member, said tongue extending across the cavity with its reentrant end seated on one wall of the cavity and bearing against an adjacent partition, while the free end of the locking tongue is spaced from a cavity wall opposed to said partition, the wall on which the locking tongue is seated being provided with a conductor wire-receiving opening, one edge of which is in alignment with said opposed cavity wall, the opposite edge of said opening being under the free end of the locking tongue, whereby a conductor wire inserted through said opening will be clamped between said opposed cavity wall and the end of said locking tongue and said locking tongue acts as a rigid strut member wedged between the opposed cavity wall and the said partition.

13. A wiring device as recited in claim 12 wherein the portion of the opposed cavity wall which is in line with said conductor wire-receiving opening is in the form of a conductor wire-receiving groove.

14. In an electric switch, a housing comprising a base member and a cover member, a pair of spaced contact members at one end of the housing, the terminal bar connected to each contact member, said housing having wall surfaces against which the terminal bars rest which form rigid backings for them, a wall of the housing being provided adjacent to each terminal bar with a conductor wire-receiving opening, an edge of which is in line with the terminal bar, a locking tongue associated with each terminal bar having a free end which stands over a conductor wire-receiving opening in opposed relation to a terminal bar and which extends across a wall of the housing and in alignment with such opening, the opposite end of said locking tongue being formed at a reentrant angle with a movable offset arm having a termination which is held fixed within the housing so to hold the reentrant end of the locking tongue seated on the wall having the wire-receiving opening and bearing against a projection extending from said last-mentioned wall, whereby a conductor wire may be inserted through each of said openings to compress the locking tongue and its related offset arm into wedged engagement between the terminal bar and the end of said locking tongue.

References Cited in the file of this patent

UNITED STATES PATENTS

| 1,564,761 | Daiker | Dec. 8, 1925 |
| 1,568,585 | Brune, Sr. | Jan. 5, 1926 |
| 1,950,826 | Smart | Mar. 13, 1934 |
| 1,960,191 | Staub et al. | May 22, 1934 |
| 2,216,740 | Hubbell | Oct. 8, 1940 |
| 2,360,444 | Pollock | Oct. 17, 1944 |
| 2,431,366 | Buell | Nov. 25, 1947 |
| 2,617,844 | Sanda | Nov. 11, 1952 |
| 2,671,204 | Hubbell | Mar. 2, 1954 |

FOREIGN PATENTS

| 310,985 | Germany | Feb. 17, 1919 |